United States Patent [19]

Martin et al.

[11] Patent Number: 5,673,875

[45] Date of Patent: Oct. 7, 1997

[54] STABILIZING INFLIGHT PARACHUTE SYSTEM

[76] Inventors: Joseph R. Martin, 250 Davis Dr. #609, Newmarket, Ont., Canada, L3Y 7T7; George Spector, 233 Broadway Rm 702, New York, N.Y. 10279

[21] Appl. No.: 380,568

[22] Filed: Jan. 30, 1995

[51] Int. Cl.[6] .................. B64D 17/38; B64D 17/80
[52] U.S. Cl. ................. 249/139; 244/144; 244/147
[58] Field of Search .................. 244/107, 138 R, 244/139, 140, 144, 147, 149

[56] References Cited

U.S. PATENT DOCUMENTS

| | | | |
|---|---|---|---|
| 1,499,147 | 6/1924 | Blair | 244/139 |
| 1,715,284 | 3/1929 | Forsyth | 244/139 |
| 1,823,758 | 9/1931 | Owens | 244/139 |
| 1,823,799 | 9/1931 | Friedrich | 244/139 |
| 1,853,874 | 4/1932 | Monteleone | 244/139 |
| 1,856,397 | 5/1932 | Motter | 244/139 |
| 2,193,029 | 3/1940 | Juul | 244/144 |
| 2,477,987 | 8/1949 | Smith | 244/138 R |
| 3,051,420 | 8/1962 | Novak | 244/139 |
| 3,107,887 | 10/1963 | Dixon et al. | 244/139 |
| 3,125,314 | 3/1964 | Smith | 244/139 |
| 3,508,727 | 4/1970 | Willems | 244/140 |

*Primary Examiner*—Andres Kashnikow
*Assistant Examiner*—Virna Lissi Mojica
*Attorney, Agent, or Firm*—Michael I. Kroll

[57] ABSTRACT

A stabilizing in-flight parachute system for an airplane comprising a retractable canopy built into a top portion of a fuselage of the airplane. A parachute is under the canopy, while a framework is attached to the parachute. A device is for winding and unwinding the parachute on the framework. A facility is for retracting the canopy and exposing the parachute. A mechanism is for accelerating deployment of the parachute out from the fuselage of the airplane, when the canopy is retracted.

3 Claims, 2 Drawing Sheets

5,673,875

STABILIZING INFLIGHT PARACHUTE SYSTEM

BACKGROUND OF THE INVENTION

The instant invention relates generally to aircraft and more specifically it relates to a stabilizing in-flight parachute system, which provides a mechanism to deploy parachutes out from a canopy when there is a problem during flight.

There are available various conventional aircraft which do not provide the novel improvements of the invention herein disclosed.

SUMMARY OF THE INVENTION

A primary object of the present invention is to provide a stabilizing in-flight parachute system that will overcome the shortcomings of the prior art devices.

Another object is to provide a stabilizing in-flight parachute system, that will deploy parachutes out from a canopy in an airplane if there is a problem during flight and in a difficult landing, so as to prevent the airplane from plunging to the earth and crashing.

An additional object is to provide a stabilizing in-flight parachute system, that can return the parachutes back into the canopy in the airplane once the danger has abated.

A further object is to provide a stabilizing in-flight parachute system that is simple and easy to use.

A still further object is to provide a stabilizing in-flight parachute system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
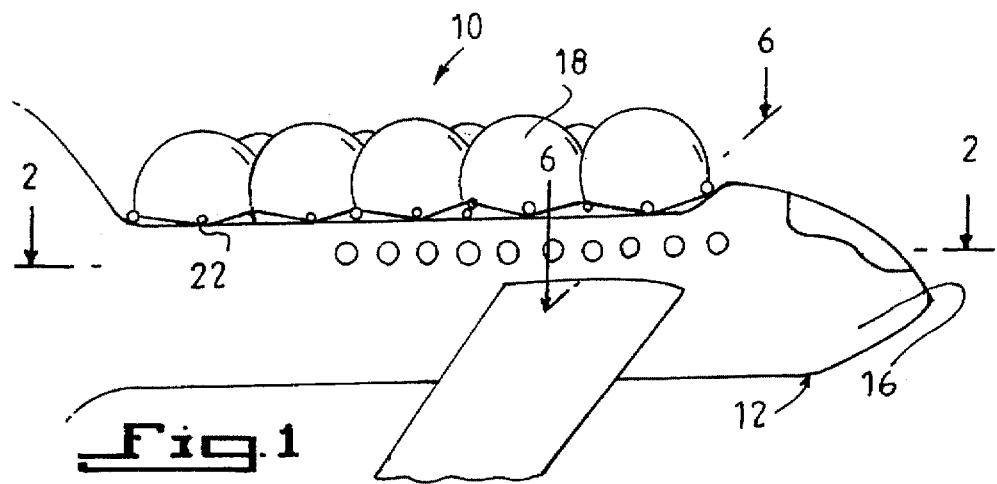
FIG. 1 is a perspective view of an aircraft with the instant invention being deployed therefrom.
Figure 2:
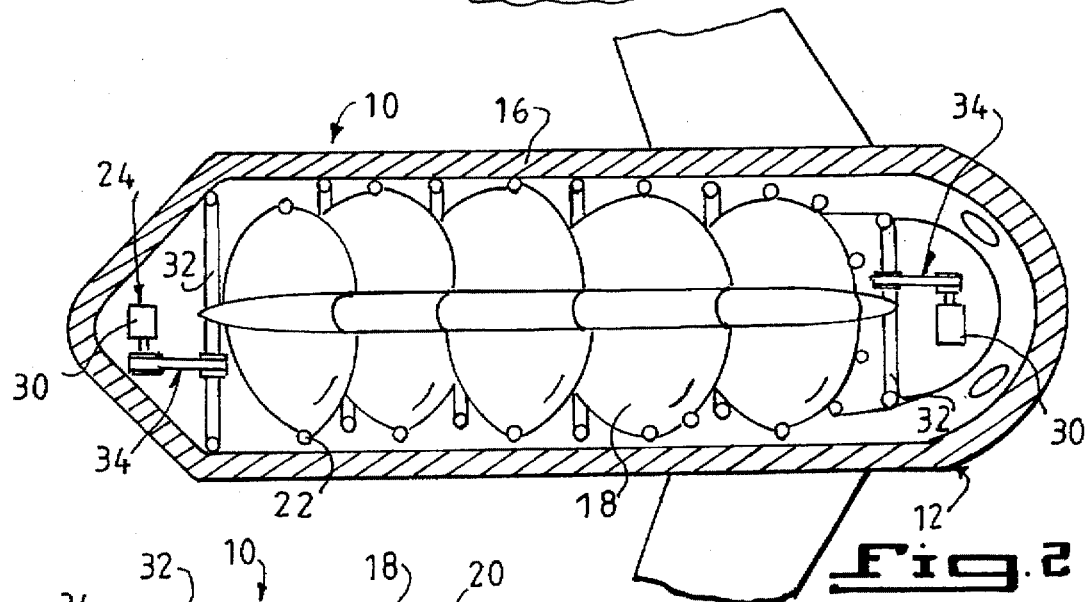
FIG. 2 is a diagrammatic cross sectional view taken along line 2—2 in FIG. 1.
Figure 3:
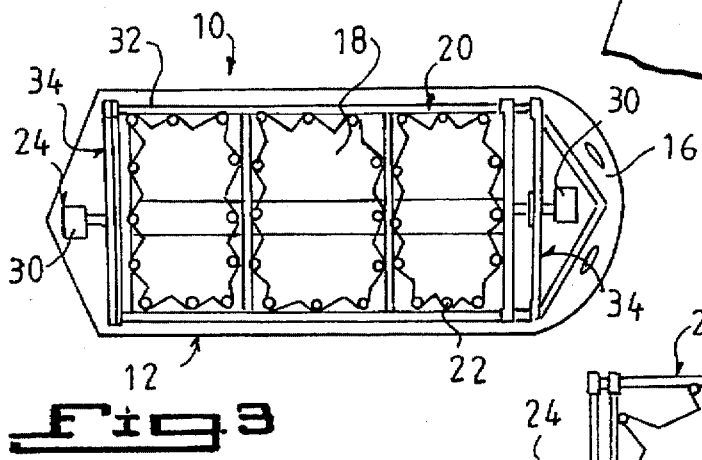
FIG. 3 is a diagrammatic top view showing the parachutes built into the aircraft.
Figure 4:
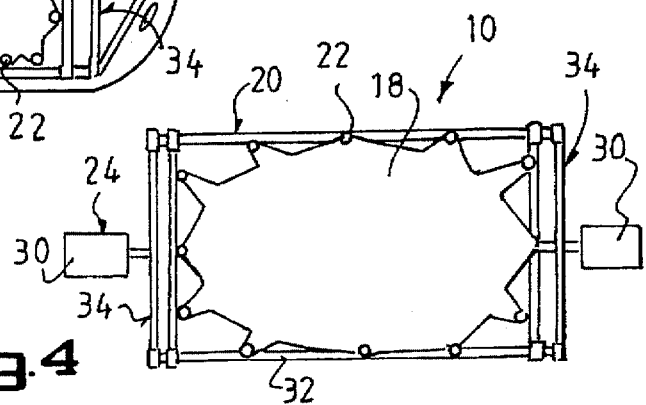
FIG. 4 is a diagrammatic top view similar to FIG. 3, showing a single parachute.
Figure 5:
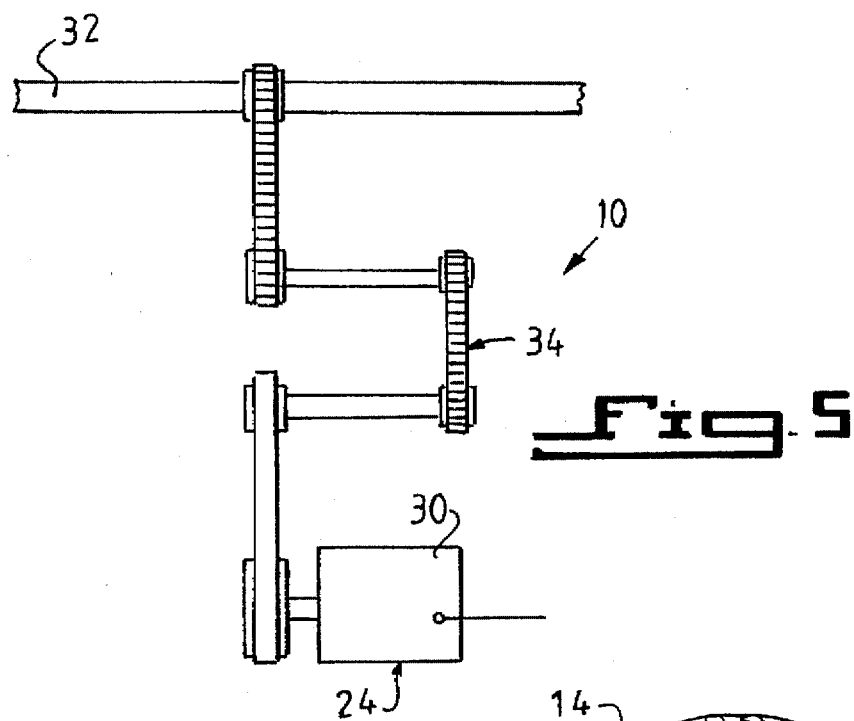
FIG. 5 is a diagrammatic side view showing the motor and pulley drive assembly.

Turning now descriptively to the drawings, in which similar reference characters denote similar elements throughout the several views, FIGS. 1 through 7 illustrate a stabilizing in-flight parachute system 10 for an airplane 12, comprising a retractable canopy 14 built into a top portion of a fuselage 16 of the airplane 12. A parachute 18 is under the canopy 14, while a framework 20 is attached to the parachute 18 via cords 22. A device 24 is for winding and unwinding the parachute 18 on the framework 20. A facility 26 is for retracting the canopy 14 and exposing the parachute 18. A mechanism 28 is for accelerating deployment of the parachute 18 out from the fuselage 16 of the airplane 12, when the canopy 14 is retracted.

The winding and unwinding device 24 includes a pair of reversible electric motors 30. A pair of crossbars 32 are provided, with each connected in a rotatable manner to one end of the framework 20. A pair of belt drive assemblies 34 are also provided, with each connected between one motor 30 and one crossbar 32.

Figure 7:
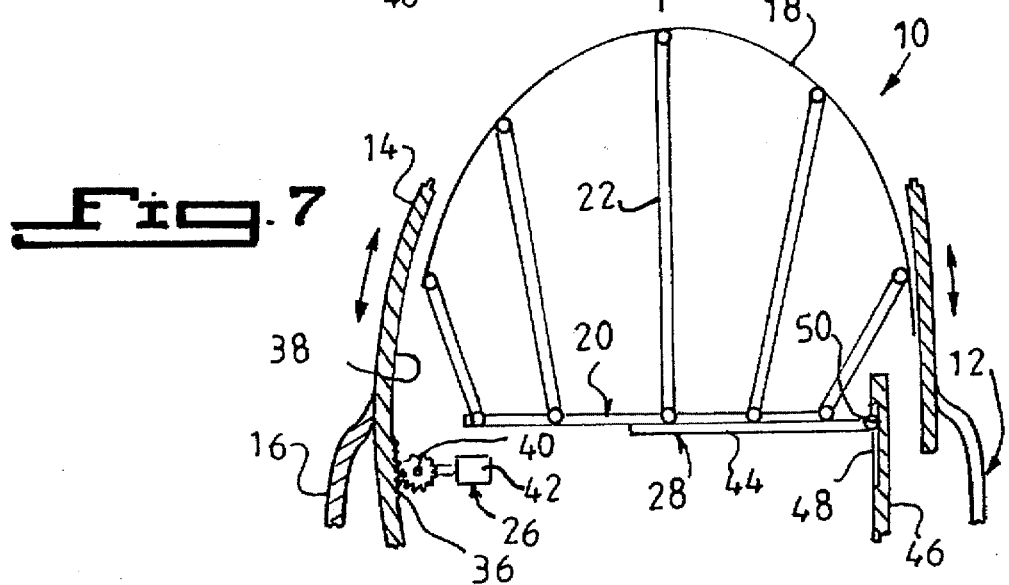
FIG. 7 is a diagrammatic cross sectional view similar to FIG. 6, showing the canopy being retracted with the parachute being deployed therefrom.

The retracting facility 26, as shown in FIG. 7, consists of a curved rack 36 formed on a portion of an inner surface 38 of the canopy 14. A pinion gear 40 is in engagement with the rack 36. A motor 42 drives the pinion gear 40 on the rack 36, so as to open and close the canopy 14.

Figure 6:
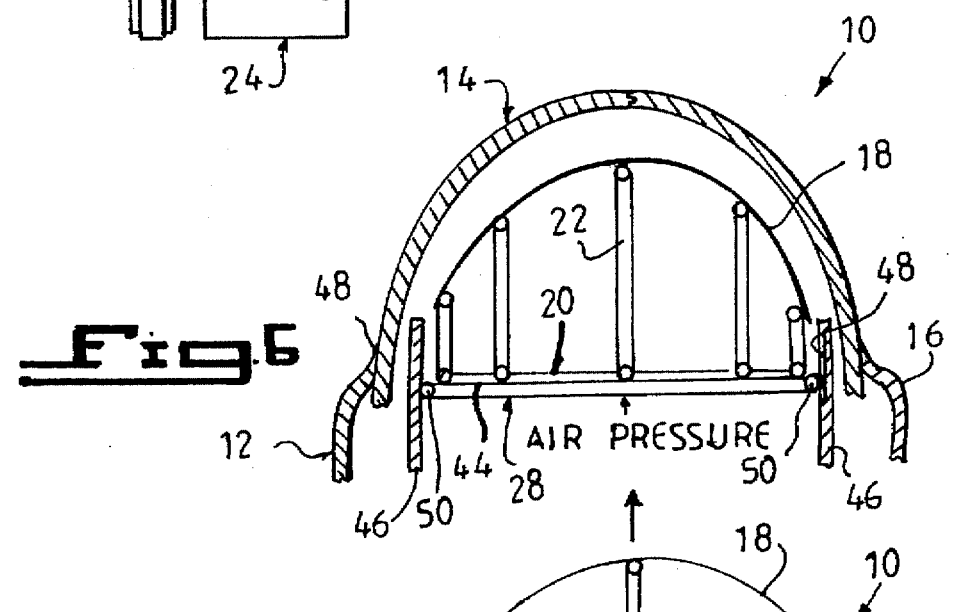
FIG. 6 is a diagrammatic cross sectional view taken along line 6—6 in FIG. 1, showing the canopy closed over a folded parachute.

The deployment accelerating mechanism 28, as shown in FIGS. 6 and 7, contains a platform 44 mounted to the underside of the framework 20. A pair of side walls 46 are within the fuselage 16 behind opposite sides of the canopy 14. Each side wall 46 has a vertical inner track 48 therein. a pair of seal rollers 50 are provided. Each seal roller 50 is mounted on opposite ends of the platform 44, to ride within one track 48. When the canopy 14 is opened by being retracted into the fuselage 16, air pressure from within the fuselage 16 will lift the platform 44, the framework 20 and the parachute 18 upwardly as in FIG. 7.

OPERATION OF THE INVENTION

To use the stabilizing in-flight parachute system 10 when there is danger in the air, the pilot of the airplane 12 will press a button in the cockpit. The retracting facility 26 will activate and cause the canopy 14 to open. At the same time, the device 24 will unwind the parachute 18 on the framework 20. Once the canopy 14 is completely opened, the deployment accelerating mechanism 28 will now lift the parachute 18 on the framework 20 upwardly, so that the parachute 18 can now open fully to slow down the airplane 12 and prevent crashing into the earth.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A stabilizing in-flight parachute system for an airplane comprising:
   a) a retractable canopy built into a top portion of a fuselage of the airplane;
   b) a parachute under said canopy;
   c) a framework attached to said parachute;
   d) means for winding and unwinding said parachute on said framework said winding and unwinding means including:
      i) a pair of reversible electric motors;
      ii) a pair of crossbars, each connected in a rotatable manner to one end of said framework; and
      iii) a pair of belt drive assemblies, each connected between one said motor and one said crossbar;
   e) means for retracting said canopy and exposing said parachute; and f) means for accelerating deployment of said parachute out from the fuselage of the airplane, when said canopy is retracted.

2. A stabilizing in-flight parachute system as recited in claim 1, wherein said retracting means includes:

a) a curved rack formed on a portion of an inner surface of said canopy;

b) a pinion gear in engagement with said rack; and c) a motor to drive said pinion gear on said rack, so as to open and close said canopy.

3. A stabilizing in-flight parachute system as recited in claim 2, wherein said deployment accelerating means includes:

a) a platform mounted to the underside of said framework;

b) a pair of side walls within the fuselage behind opposite sides of said canopy, with each said side wall having a vertical inner track therein; and c) a pair of seal rollers, each said seal roller mounted on opposite ends of said platform to ride within one said track, so that when said canopy is opened by being retracted into the fuselage, air pressure from within the fuselage will lift said platform, said framework and said parachute upwardly.

* * * * *